United States Patent
Perumal et al.

(10) Patent No.: US 12,552,716 B2
(45) Date of Patent: Feb. 17, 2026

(54) DE-POWDERING OF GREEN SAMPLES USING FREEZING METHOD FOR ADDITIVE MANUFACTURING

(71) Applicant: ENTEGRIS, INC., Billerica, MA (US)

(72) Inventors: Thines Kumar Perumal, Singapore (SG); Subhash Guddati, Singapore (SG); Aravind Vasanthakumar, Singapore (SG); Montray Leavy, Singapore (SG); Rocky Dean Gipson, Arroyo Grande, CA (US); Edward A. Sturm, New Milford, CT (US)

(73) Assignee: ENTEGRIS, INC., Billerica, MA (US)

( * ) Notice: Subject to any disclaimer, the term of this patent is extended or adjusted under 35 U.S.C. 154(b) by 183 days.

(21) Appl. No.: 18/215,097

(22) Filed: Jun. 27, 2023

(65) Prior Publication Data
US 2023/0416154 A1    Dec. 28, 2023

Related U.S. Application Data

(60) Provisional application No. 63/356,243, filed on Jun. 28, 2022.

(51) Int. Cl.
| | |
|---|---|
| *C04B 35/18* | (2006.01) |
| *B33Y 40/20* | (2020.01) |
| *C04B 35/626* | (2006.01) |
| *C04B 35/64* | (2006.01) |

(52) U.S. Cl.
CPC ............. *C04B 35/18* (2013.01); *B33Y 40/20* (2020.01); *C04B 35/62645* (2013.01); *C04B 35/64* (2013.01); *C04B 2235/3463* (2013.01); *C04B 2235/349* (2013.01); *C04B 2235/5436* (2013.01); *C04B 2235/6021* (2013.01);
(Continued)

(58) Field of Classification Search
CPC ........................ B23K 26/046; B23K 26/032; B23K 26/0643; B23K 26/0861; B23K 26/342; B23K 26/0624; B33Y 10/00; B33Y 30/00; B33Y 50/02; B33Y 40/00; B82Y 40/00; B22F 10/25; B22F 10/36; B22F 12/43; B22F 12/44; B22F 12/90; B29C 64/124; B29C 64/264; B29C 64/393
See application file for complete search history.

(56) References Cited

U.S. PATENT DOCUMENTS

| 5,628,938 A * | 5/1997 | Sangeeta ............... C04B 35/573 264/28 |
|---|---|---|
| 5,746,957 A | 5/1998 | Fanelli |
| 10,071,502 B2 * | 9/2018 | Klotz .................... C04B 35/583 |

(Continued)

FOREIGN PATENT DOCUMENTS

| CN | 108136385 A | 6/2018 | |
|---|---|---|---|
| CN | 110228996 A * | 9/2019 | ............. C04B 35/64 |

(Continued)

*Primary Examiner* — Nahida Sultana

(57) ABSTRACT

A method for producing an article and a system associated with the method are provided. The method includes providing a green part, cooling the green part to a temperature below the freezing point of the ink to form a hardened mass and loosely-attached powder particles, and removing the loosely-attached powder particles. The green part includes powder particles, an ink, and optionally a binder. The loosely-attached powder particles removed from the green part may be recycled and reused.

20 Claims, 2 Drawing Sheets

(52) U.S. Cl.
CPC ............... *C04B 2235/6022* (2013.01); *C04B 2235/6026* (2013.01)

(56) References Cited

U.S. PATENT DOCUMENTS

| | | | |
|---|---|---|---|
| 2006/0249889 A1* | 11/2006 | Bausinger | B22C 9/04 |
| | | | 264/651 |
| 2015/0290635 A1 | 10/2015 | Inokawa | |
| 2018/0009716 A1* | 1/2018 | Easley | C04B 35/62834 |
| 2020/0122390 A1 | 4/2020 | Zivcec | |
| 2020/0398456 A1* | 12/2020 | Rezaei | B01J 20/32 |
| 2021/0060651 A1 | 3/2021 | Go | |

FOREIGN PATENT DOCUMENTS

| | | | |
|---|---|---|---|
| CN | 114573323 A | 6/2022 | |
| JP | 5088342 B2 | 12/2012 | |
| JP | 2015131479 A | 7/2015 | |
| TW | 201930090 A | 8/2019 | |

\* cited by examiner

DE-POWDERING OF GREEN SAMPLES USING FREEZING METHOD FOR ADDITIVE MANUFACTURING

TECHNICAL FIELD

The present disclosure relates to a method and a system for producing an article using powder particles, a solvent, and optionally a binder as raw materials. Particularly, the present disclosure provides a method for de-powdering, wherein the powder particles collected from the de-powdering process may be reused because of their unchanged properties.

BACKGROUND

In additive manufacturing processes, such as inkjet printing, binder jet printing, and extrusion, a green part is formed from a feedstock including powder particles, and there are usually loosely-attached powder particles included in or surrounding the green part. To obtain a final part from the green part, in general, the following steps are needed: a first de-powering step performed after the formation of the green part to remove the powder particles, such as those unattached to the green part; a sintering step where the green part is sintered at a high temperature to reach sufficient strength for further handling; and a second de-powdering step performed after sintering to remove loosely-attached powder particles. Considering cost-effectiveness, it is desirable to recycle and reuse the removed powder particles.

However, when the feedstock includes powder particles that are made of temperature-sensitive materials, the resulting green part will be also temperature-sensitive, and the properties, such as chemical structure, chemical composition, particle size or particle size distribution, crystalline structure, etc., of the green part and the powder particles may be affected in the high temperature sintering step, due to poor thermal stability of the temperature-sensitive materials. The properties of the loosely-attached powder particles are also changed after the sintering step. As a result, it is extremely challenging to deal with such feedstock, not to mention to recycle the removed powder particles, especially the loosely-attached powder particles, for use.

In addition, even when these loosely-attached powder particles with changed properties are recycled and reused in the additive manufacturing process, the quality of the resulting green part cannot be assured, and corresponding properties of the resulting green part are weakened. Therefore, the loosely-attached powder particles with changed properties may not be suitable to be reused, and the cost of the additive manufacturing processes is undesirably increased due to wastage of the loosely-attached powder particles.

Accordingly, there is a need for an improved method for producing a final part from a feedstock including temperature-sensitive materials.

SUMMARY

The following presents a simplified summary of the basic features of the present disclosure in order to provide a basic understanding of some of its aspects.

The present disclosure provides a method for producing an article. A green part including powder particles, an ink and optionally a binder is provided. The green part is cooled to a temperature below the freezing point of the ink to form a hardened mass and loosely-attached powder particles, and the loosely-attached powder particles are removed.

The present disclosure further provides a system for producing an article. The system includes a first component, a second component, and a third component. The first component is for producing a green part. The green part includes powder particles, an ink and optionally a binder. The second component is for cooling the green part to a temperature below the freezing point of the ink to form a hardened mass and loosely-attached powder particles. The third component is for removing the loosely-attached powder particles.

BRIEF DESCRIPTION OF THE DRAWINGS

Aspects of some embodiments of the present disclosure are readily understood from the following detailed description when read with the accompanying figures.

DESCRIPTION

Figure 1:
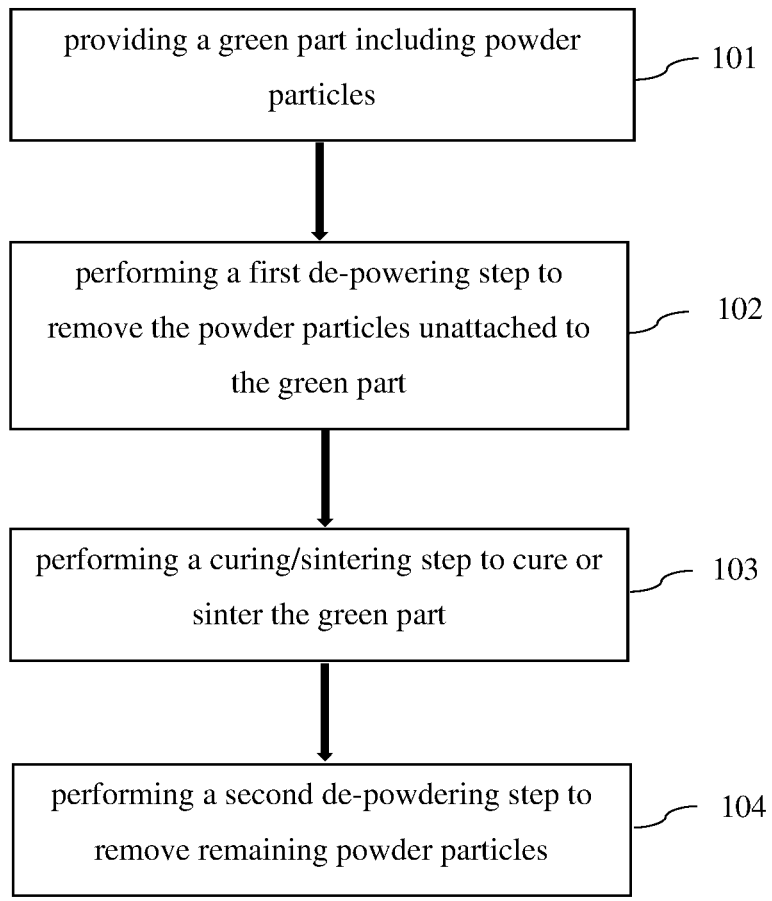
FIG. 1 shows a conventional additive method for producing an article, where the separation of loosely-attached powder particles is performed after a curing/sintering step.

To simplify the description, descriptions and details of well-known steps and components may be omitted.

As used herein, the singular forms "a," "an," and "the" include plural referents unless the content clearly dictates otherwise. As used herein, the term "or" is generally employed to include "and/or" unless the content clearly dictates otherwise.

As used herein, the terms "approximately," "basically," "substantially," and "about" are used for describing and considering a small variation. When used in combination with an event or circumstance, the term may refer to a case in which the event or circumstance occurs precisely, or a case in which the event or circumstance occurs approximately.

As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all ranges indicated in the disclosure include endpoints.

The terms "first," "second," "third," and the like (as used in part of a component name) in the claims and/or specific embodiments are used to distinguish components, and do not necessarily describe an order in time, space, rank, or any other manner. It should be understood that such terms may be interchanged under appropriate circumstances, and the embodiments described herein may be operated in other orders than that described or exemplified herein.

The term "some embodiments" means that specific features, structures, or characteristics described in combination with the embodiments are included in at least one embodiment of the present disclosure. Therefore, the phrase "in some embodiments" appearing at various locations throughout this specification does not necessarily refer to the same embodiment, but in some cases, may refer to the same embodiment.

It will be apparent to a person of ordinary skill in the art that, in one or more embodiments, specific features, structures, or characteristics may be combined in any appropriate manner.

The following disclosure provides various embodiments or examples for implementing different features of the present disclosure. The descriptions are merely examples and not intended to be limiting.

The present disclosure relates to a method for producing an article from a green part comprising powder particles, an ink, and optionally a binder. The method includes the following steps: (a) providing a green part including powder particles, an ink, and optionally a binder; (b) cooling the green part to a temperature below the freezing point of the ink to form a harden mass and loosely-attached powder particles; and (c) removing the loosely attached powder particles.

In some embodiments, the green part in step (a) is prepared by an additive manufacturing process. The additive manufacturing process, which is also known as three-dimensional (3D) printing, may include inkjet printing, binder jet printing, and extrusion. In some other embodiments, the method according to the present disclosure are understood to be useful with other techniques, such as powder pressing or injection molding, to prepare the green part.

In some embodiments, the green part may be prepared by the following steps: (a-1) forming a layer of the powder particles, and (a-2) applying a mixture including the ink to a predetermined region of the layer of the powder particles. The steps (a-1) and (a-2) can be repeated several times as needed to prepare a green part with sufficient thickness. The resulting green part includes the powder particles and the ink. In some embodiments, a binder may be included in the green part to further enhance the binding strength among the powder particles. The binder may be admixed with the powder particles in step (a-1) to form the layer of the powder particles; or the binder may be admixed with the ink in step (a-2) to form the mixture for applying to the predetermined region of the layer of the powder particles.

The powder particles according to the present disclosure may be any powder particles suitable for forming a green part. In some embodiments, the powder particles may be temperature-sensitive materials. In some embodiments, the powder particles may be temperature-sensitive materials and examples thereof include, but are not limited to, zeolite, metal-organic frameworks (MOFs), a metal, a ceramic material, a pharmaceutical drug or any combination thereof. Examples of the powder particles used in the present disclosure include, but are not limited to a composite comprising zeolite and MOFs. In some embodiments, the powder particles have intrinsic porosity.

The size of the powder particles may be in any range depending on practical needs. In some embodiments, the powder particles may have an average particle size in the range from 2 μm to 100 μm, such as 2 nm, 5 nm, 10 nm, 20 nm, 40 nm, 60 nm, 70 nm, 80 nm, 90 nm or 100 nm. The average particle size (d50) refers to a particle size at a cumulative volume distribution of 50% (i.e., average particle size or median diameter) in the particle size distribution. In some embodiments, the average particle size can be measured by a laser diffraction method.

Zeolites are porous materials in a crystalline form. Zeolites are usually aluminosilicates. The zeolite to the present disclosure may be any zeolite suitable for forming a green part. Examples of the zeolite used in the present disclosure include, but are not limited to, Zeolite 4A, Zeolite 3A, Zeolite 13X or Zeolite Ca-A.

Metal-organic frameworks (MOFs) are a class of porous materials which contain metal ions and organic ligands. The variety of metal ions and organic ligands enables the MOFs to have with tunable structure, surface area, charge conductivity, and even flexibility. The MOFs according to the present disclosure may be any MOFs suitable for forming a green part. Examples of the MOFs used in the present disclosure include, but are not limited to, ZIF-8, MIL-100, IRMOF-1, M-MOF-74, CPO-27-M or DMOF-1.

In some embodiments, the powder particles may include metal powder particles. The material for the metal powder particles according to the present disclosure may be any metal suitable for forming a green part, and examples thereof include, but are not limited to, steel, Cu, Ni, Al, Ti or an alloy thereof.

In some embodiments, the powder particles may include ceramic powder particles. The material for the ceramic powder particles according to the present disclosure may be any ceramic material suitable for forming a green part. Examples of the ceramic material used in the present disclosure include, but are not limited to, oxides, such as alumina and zirconia; and carbides; nitrides; or borides.

In some embodiments, the powder particles may be powder particles of pharmaceutical drugs. The pharmaceutical drugs according to the present disclosure may be any pharmaceutical drugs suitable for forming a green part.

In some embodiments, the powder particles may include two or more kinds of powder particles. With the use two or more kinds of powder particles, the properties, such as porosity, adsorptivity or other physical or chemical properties, of the final part can be adjusted as needed. For example, in some embodiments, the powder particles may include a combination of zeolite and MOFs, and the porosity, structures and chemistries of the resulting final part (or final product) may be tailored and may be used as highly specialized adsorbents for removing specific impurities from gas streams or from storage gases.

The ink according to the present disclosure may be any ink suitable for forming a green part. The ink may be any suitable solvent. Examples of the ink include, but are not limited to, deionized water, an alcohol, or any combination thereof. Examples of the alcohol include, but are not limited to, methanol, ethanol or isopropanol. The amount of the ink is not particularly limited and is generally determined based on the profile of the final product (or the surface area of the predetermined region).

As discussed hereinabove, in some embodiments, besides the powder particles and the ink, the green part may further include a binder to further enhance the binding strength among the powder particles. The binder according to the present disclosure may be any binder suitable for forming a green part. Examples of the binder include, but are not limited to, bentonite clay, kaolin, silica or any combination thereof. The amount of the binder is not particularly limited and can be any suitable amount. In some embodiment, the amount of the binder is in the range of 0.5% to 30% (e.g., 0.5%, 1%, 2%, 5%, 10%, 15%, 20%, 25% or 30%), based on the total weight of the powder particles and the binder.

According to the present disclosure, after applying the mixture including the ink to a predetermined region of the layer of the powder particles to form a green part, the green part is cooled to a temperature below the freezing point of the ink in step (b). As a result, a hardened mass and loosely attached powder particles are formed with the frozen ink.

The cooling in step (b) may be performed by any suitable method. In some embodiments, the cooling may be performed by a freezing method, for example, by placing the green part in a freezer for a duration of time to sufficiently freeze the ink. The temperature or time duration of cooling are not particularly limited. In some embodiments, the temperature below the freezing point of the ink refers to a temperature which is at least 5° C. less than the freezing point of the ink, for example, at least 5° C., at least 8° C., or at least 10° C. less than the freezing point of the ink. In some embodiments according to the present disclosure, the time duration of cooling may be one hour, 3 hours, 5 hours, 15 hours or more.

In some embodiments, when the pressure is too low, the ink may escape from the green part during cooling and thus the hardened mass cannot form. To prevent the ink from escaping from the green part, the cooling may be performed under pressure when needed.

In some embodiments, after the cooling step, the powder particles may be presented in three different forms: (1) a hardened mass; (2) loosely-attached powder particles; and (3) free powder particles. The hardened mass is the desirable product in step (b) and includes powder particles and the ink applied thereto. In the hardened mass, the powder particles are fixed by the frozen ink. The loosely-attached powder particles are not strongly-fixed in the hardened mass but loosely attach to the hardened mass due to bleeding of the ink. The remaining powder particles are free powder particles. Due to the lack of the ink, the free powder particles are not strongly-fixed as those in the hardened mass and do not loosely attach to the hardened mass as the loosely-attached powder particles.

Since the loosely-attached powder particles produced in step (b) loosely attach to the hardened mass and the powder particles in the desirable hardened mass are firmly fixed, the loosely-attached powder particles can be easily removed/separated from the hardened mass in step (c) to leave the desirable hardened mass for further processing. Furthermore, since the free powder particles are not fixed in the hardened mass or do not attach to the hardened mass, they can be easily removed in step (c) as well. In some embodiments, step (c) includes the removal of the loosely attached powder particles and the removal of free powder particles. The removal/separation of step (c) may be performed by any means known in the art, for example, but not limited to a brushing tool, compressed air or a vacuuming tool.

According to the present disclosure, by using the cooling step (b) to produce different forms of the powder particles, the unwanted powder particles (i.e., loosely-attached powder particles and free powder particles) can be easily removed from the desirable hardened mass (i.e., a printed product) at the same time. Therefore, a simpler and easier de-powdering method as compared to the two-step de-powdering method in the related art can be provided. In addition, since the loosely-attached powder particles and the free powder particles are removed prior to the high temperature curing/sintering step, the properties of loosely-attached powder particles and the free powder particles will not deteriorate due to exposure to high temperature and thus they can be collected and recycled for re-use. In some preferred embodiments, the loosely-attached powder particles and the free powder particles can be completely recycled and reused (e.g., in additive manufacturing processes or the like), and therefore, there is zero wastage. As a result, the method of the present disclosure is simple, easy and cost-effective, and is particularly beneficial to the product containing thermally sensitive materials.

In some embodiments, the properties of the loosely-attached powder particles and the free powder particles removed in step (c) may be substantially the same as those of the powder particles for the formation of the green part. In some embodiments, the loosely-attached powder particles and the free powder particles have one or more of the following properties substantially the same as the powder particles in step (a): chemical structure, chemical composition, crystalline structure, powder shape, powder size and powder spreadability. In some embodiments, the loosely-attached powder particles may be dried and/or purified to remove the ink.

In some embodiments, the method of the present disclosure may further include: step (d) sintering the hardened mass after step (c). In some embodiments, the powder particles in the hardened mass are bonded together to form a sintered article during step (d). In some embodiments, the ink is removed during sintering. In some embodiment, the sintered article is a final product. In some embodiments, the final product is suitable for gas storage, gas purification, pharmaceutical products, such as drugs, etc.

In some embodiments, the sintered article may be formed as a porous article when the powder particles are not compactly packed or the powder particles having intrinsic porosity are used in step (a). In some embodiments, inkjet printing or binder jet printing process may be used to prepare a green part for forming a porous article.

In the present disclosure, the term "sintering" can be used to refer to processes of bonding (e.g., "welding" or "fusing") together a collection of powder particles by applying heat and optional pressure to the powder particles in a non-oxidizing environment so that the surfaces of the powder particles reach a temperature that causes the particle surfaces to become fused together by a physical (mechanical) bond between the particle surfaces, but that does not cause the powder particles to melt (i.e., none of the material(s) of the powder particles reaches its melting temperature).

The sintering in step (d) is performed at a temperature that is above the sintering point of the powder particles, but below the melting temperature of the powder particles. In the present disclosure, a "sintering point" of a powder particle is a temperature at which the material of the powder particles is capable of being sintered, i.e., a temperature at which a powder particle begin adhering to other powder particles, and can be fused to another particle of the same material or of a different material. A sintering point of a material is normally below a melting temperature of the material, meaning the temperature at which the material becomes liquid.

FIG. 1 shows a conventional additive method for producing an article, which includes: providing a green part including powder particles 101; performing a first de-powering step to remove the powder particles unattached to the green part (i.e., free powder particles) 102; performing a curing/sintering step to cure or sinter the green part 103; and performing a second de-powdering step to remove remaining powder particles 104. In the conventional method, two de-powering steps are required to remove unwanted powder particles. In the first de-powering step, though free powder particles can be removed and recycled for use while it is difficult to remove loosely-attached powder particles without damaging the green part. On the other hand, though the second de-powering step is adopted to remove the remaining unwanted particle, it is performed after a curing/sintering step and the chemical structure and properties of the powder particles may be altered during the curing/sintering step, which makes it difficult to remove the loosely-attached powder particles from the sintered/cured article and to recycle the removed powder particles for use.

Figure 2:
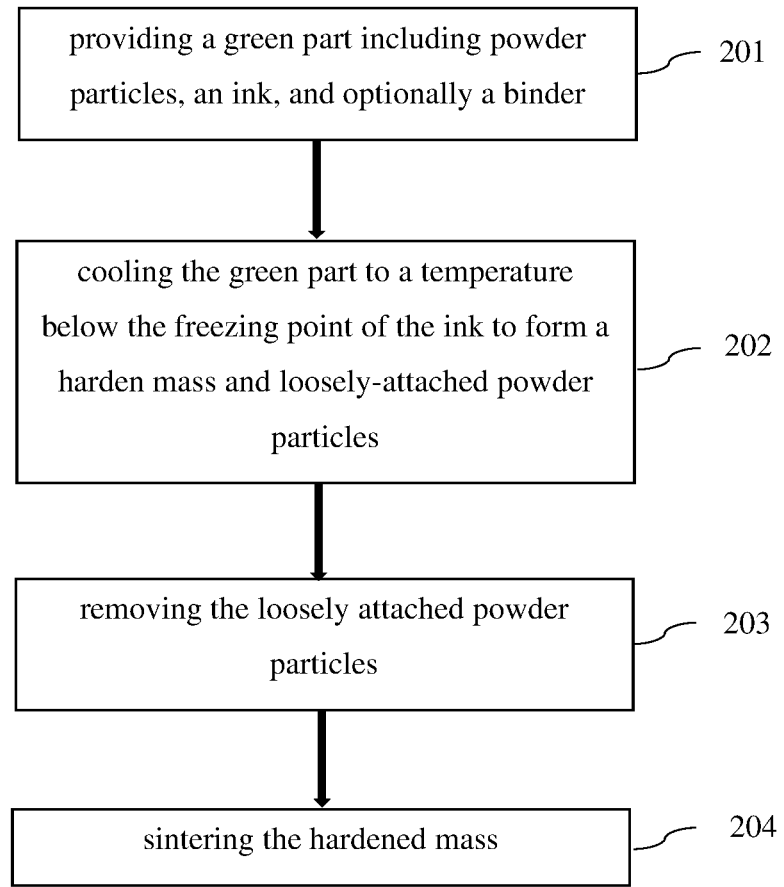
FIG. 2 shows the method for producing an article according to an embodiment of the present disclosure.

FIG. 2 shows the method for producing an article according to an embodiment of the present disclosure. The method includes: providing a green part including powder particles, an ink, and optionally a binder 201; cooling the green part to a temperature below the freezing point of the ink to form a harden mass and loosely-attached powder particles 202; removing the loosely attached powder particles 203; and sintering the hardened mass 204. As discussed above, by using the cooling step, in the method of the present disclosure, the unwanted powder particles, i.e., loosely-attached powder particles and free powder particles, can be easily removed from the hardened mass (i.e., a printed product) at the same time since the powder particles in the hardened mass are firmly fixed by the frozen ink. In addition, the powder particles are removed prior to the curing/sintering step, so their properties will not be affected by the high temperature curing/sintering step and thus they can be recycled for use. As a result, the method of the present disclosure is simple, easy and cost-effective, and is particularly beneficial to the product containing thermally sensitive materials.

The present disclosure further provides a system for producing an article, which includes: a first component for producing a green part including powder particles, an ink, and optionally a binder; a second component for cooling the green part to a temperature below the freezing point of the ink to form a hardened mass and loosely-attached powder particles; and a third component for removing the loosely-attached powder particles.

In some embodiments, the first component may be an apparatus for three-dimensional printing, powder pressing or injection molding processes. The three-dimensional printing process may be inkjet printing, binder jet printing or extrusion printing.

In some embodiments, the second component may be a freezer or other suitable cooling apparatus.

In some embodiments, the third component includes one or more of a brushing tool, compressed air, or a vacuuming tool.

In some embodiments, the present system may further include a fourth component for sintering the hardened mass.

EXAMPLES

Example 1

1. Preparation of a Green Part

A mixture including zeolite powder (Zeolite 4A) and 7% bentonite clay based on the total weight of the mixture was prepared and used to form layers of the mixture on a supporting substrate. Deionized water was applied to a predetermined region of the layer of the mixture. The above operations were repeated several times to form a green part with sufficient thickness.

2. Cooling the Green Part

The resulting product was placed into a laboratory freezer (158R-AEW-TSC) at a temperature of around −5° C. to −8° C. for 15 hours to freeze the deionized water and produce the following three forms of powder particles: (1) a hardened mass; (2) loosely-attached powder particles; and (3) free powder particles.

3. Removing Excess Powder Particles

After cooling, the frozen product was taken out from the freezer. The hardened mass was then taken out from the frozen product. The free powder particles and the loosely-attached powder particles were separated from the hardened mass using a soft brush. After separation, the free powder particles and the loosely-attached powder particles were collected for further analysis of physical/chemical properties.

4. Sintering the Hardened Mass

The hardened mass was then sintered at 780 degree Celsius for two hours using a sintering crucible.

Comparative Example 1

A green part was prepared using the same process as disclosed in Example 1. A first de-powdering step was performed to remove free powder particles and then a sintering step was performed at 780° C. for two hours using a sintering crucible to form a sintered article. A second de-powdering step was performed to remove additional free powder particles or loosely-attached free powder particles to obtain a final sintered article. The powder particles obtained in the first and second de-powdering step were collected for further analysis of physical/chemical properties.

Testing Method and Results

Particle Size: The particle size of the powder particles for forming the green part and the particle size of the collected powder particles are measured by using laser diffraction method.

Particle shape: The particle shape of the powder particles for forming the green part and the particle shape of the collected powder particles are observed by using optical microscope.

Crystalline structure: The crystalline structure of the powder particles for forming the green part and the crystalline structure of the collected powder particles are measured by using XRD analysis.

The properties of the powder particles for forming the green part ("original") and the collected powder particles ("collected") in Example 1 and Comparative Example 1 are shown in Table 1.

A comparison between the properties of the powder particles for forming the green part ("original") and the collected powder particles ("collected") in Example 1 and Comparative Example 1 are shown in Table 1.

TABLE 1

|  | Example 1 | Comparative Example 1 |
| --- | --- | --- |
| Particle sizes | No significant change | Aggregated |
| Particle shape | No significant change | Changed |
| Crystalline structure | No significant change | Changed |

Table 1 reveals that the powder particles collected from Example 1 have substantially the same properties as those for forming the green part. Hence, the powder particles collected from Example 1 may be reused. The wastage of the powder particles is close to zero. In contrast, the properties of the powder particles collected from Comparative Example 1 have significantly changed and thus it is difficult to reuse theses powder particles. Excessive waste powder particles are generated, and the cost of producing a final part is increased.

Several embodiments of the disclosure and features of details are briefly described above. The embodiments described in the disclosure may be easily used as a basis for designing or modifying other processes and structures for realizing the same or similar objectives and/or obtaining the same or similar advantages introduced in the embodiments of the disclosure. Such equivalent constructions do not depart from the spirit and scope of the disclosure, and various variations, replacements, and modifications can be made without departing from the spirit and scope of the disclosure.

What is claimed is:

1. A method for producing an article, comprising the following steps:
   (a) providing a green part, wherein the green part comprises powder particles, an ink, and optionally a binder;
   (b) cooling the green part to a temperature below the freezing point of the ink to form a hardened mass having loosely-attached powder particles;
   (c) de-powdering the hardened mass to remove the loosely-attached powder particles from the hardened mass; and
   (d) collecting the loosely-attached powder particles that are removed from the hardened mass.

2. The method according to claim 1, further comprising the following step:
   (d) sintering the hardened mass.

3. The method according to claim 1, wherein the powder particles are temperature-sensitive materials.

4. The method according to claim 1, wherein the powder particles are selected from the group consisting of zeolite, metal-organic frameworks (MOFs), a metal, a ceramic material, a pharmaceutical drug material and any combination thereof.

5. The method according to claim 4, wherein the powder particles comprise a composite comprising the zeolite and the MOFs.

6. The method according to claim 4, wherein the MOFs are selected from the group consisting of ZIF-8, MIL-100, IRMOF-1, M-MOF-74, CPO-27-M, DMOF-1 and any combination thereof and the zeolite are selected from the group consisting of Zeolite 4A, Zeolite 3A, Zeolite 13X, Zeolite Ca-A and any combination thereof.

7. The method according to claim 1, wherein the ink is selected from the group consisting of deionized water, an alcohol, or any combination thereof.

8. The method according to claim 1, wherein the binder is selected from the group consisting of bentonite clay, kaolin, silica and any combination thereof.

9. The method according to claim 1, wherein the size of the powder particles is in the range from 2 μm to 100 μm.

10. The method according to claim 1, wherein the temperature of cooling in step b) is at least 5° C. less than the freezing point of the ink.

11. The method according to claim 1, wherein the loosely-attached powder particles removed in step (c) have one or more of the following properties substantially the same as the powder particles in step (a): chemical structure, chemical composition, crystalline structure, powder shape, powder size and powder spreadability.

12. The method according to claim 1, wherein the loosely-attached powder particles collected in step ((d)) are recycled.

13. The method according to claim 1, wherein the green part is formed by three-dimensional printing, powder pressing or injection molding.

14. The method according to claim 13, wherein the three-dimensional printing is inkjet printing, binder jet printing or extrusion printing.

15. The method according to claim 1, further comprises: forming a layer of the powder particles and applying a mixture comprising the ink to a predetermined region of the layer of the powder particles.

16. The method according to claim 15, wherein the binder is admixed with the powder particles to form the layer of the powder particles.

17. The method according to claim 15, wherein the binder is admixed with the ink to form the mixture.

18. The method according to claim 2, wherein the powder particles in the hardened mass are bonded to form a sintered article.

19. The method according to claim 18, wherein the article is a porous sintered article.

20. The method according to claim 2, wherein the ink is removed in step (d).

* * * * *